Oct. 23, 1928.

A. LEBRECHT 1,688,548

BRONZE STAMPING MILL

Filed March 11, 1927

A. Lebrecht
INVENTOR

By: Marks & Clerk
Attys.

Patented Oct. 23, 1928.

1,688,548

UNITED STATES PATENT OFFICE.

ALFRED LEBRECHT, OF NUREMBERG, GERMANY, ASSIGNOR TO L. AUERBACH & CO., OF FURTH, GERMANY.

BRONZE-STAMPING MILL.

Application filed March 11, 1927, Serial No. 174,612, and in Germany March 15, 1926.

In all the known bronze stamping mills with mechanical feeding of the raw material, the raw material is introduced into the upper part of the stamper pot so that an intimate mixing thereof with the material already in the stamper pot is impossible, and the raw material tends to leave the stamper pot again when there is suction therein without the whole of it being worked up.

This defect is removed according to the present invention by supplying the raw material to the lower part of the stamper pot and pushing it under the material that is already in the stamper pot. Furthermore the raw material on its way from the filling hopper to the stamper pot is gradually compressed, so that it reaches the stamper pot in the form of more or less solid balls, plugs or the like.

The suction and sifting of the bronze powder produced in the stamper pot is effected with the simultaneous employment of separators and bolting hutches by means of an exhauster. Two or more stamper pots are preferably provided with a conveyor worm each and also with a separator and a bolting hutch between the stamper pots and after the last stamper pot.

Figure 1:
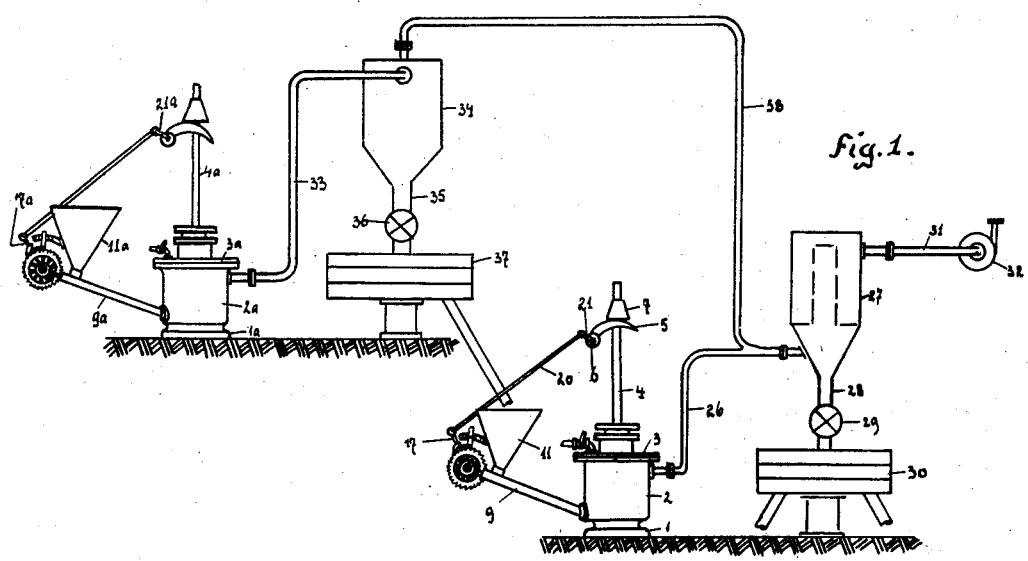
Figure 2:
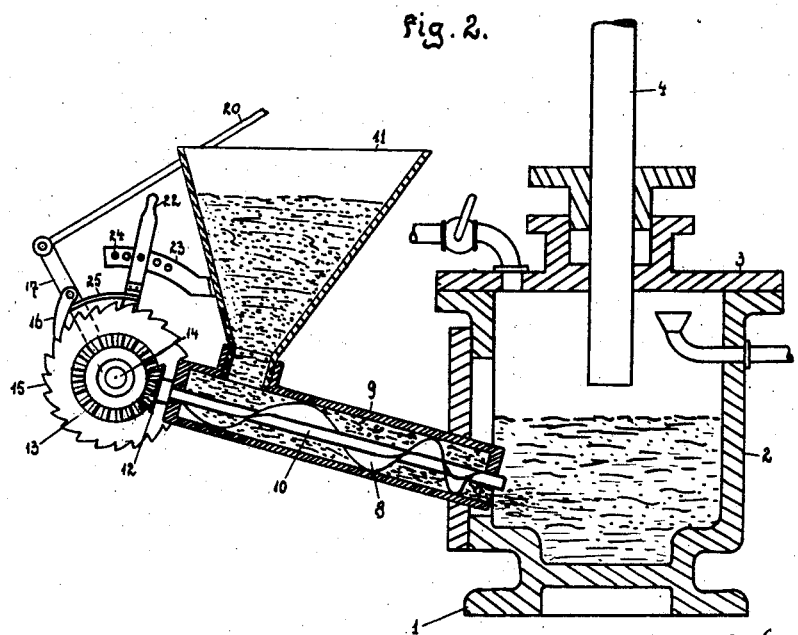

One constructional example of the invention is diagrammatically illustrated in the accompanying drawings, wherein Fig. 1 shows a bronze stamping mill in side elevation, and Fig. 2 shows the stamper pot in sectional elevation on a larger scale.

The stamper pot 2 resting upon a foundation 1 is closed at the top by a cover 3, through which the stamp 4 passes. The driving of the stamp 4 is effected by a cam 5, which is mounted upon a driving shaft 6 and comes periodically underneath a collar 7 on the stamp rod.

Into the lower part of the pot 2 there opens a worm conveyer 8, the casing 9 of which is covered, at the end that enters the pot 2, above the worm conveyer shaft 10. Outside the pot 2 there opens into the casing 9 of the worm 8 a filling hopper 11 of known kind. On the outer free end of the conveyer shaft 10 is mounted a bevel wheel 12, which meshes with a second bevel wheel 13. The bevel wheel 13 is arranged upon a stationary shaft 14, and is rigidly connected with a ratchet wheel 15, the pawl 16 of which is carried by an arm 17 which is rotatable about the shaft 14. With the arm 17 there engages a link rod 20, the free end of which is connected with a crank 21 on the driving shaft 6.

Upon the ratchet wheel shaft 14 is rotatably mounted an arm 22, which moves over an arcuate bar 23 secured to the filling hopper 11. The arcuate bar 23 contains a row of holes 24 by means of which the arm 22 can be fixed in different positions by a bolt, a peg or the like. To the arm 22 is secured a curved slide 25, which regulates the engagement of the pawl 16 with the ratchet wheel 15.

The curved slide 23 can be adjusted into any desired position within certain limits by shifting the arm 22. The nearer the curved slide 22 is moved to the pawl 16, the later does the latter come into engagement with the ratchet wheel 15, when its oscillating movement is initiated by the link rod 20, that is to say, the smaller is the angle through which the ratchet wheel 15 and the worm conveyer 8 are rotated at each oscillation of the pawl 16. The movement of the worm conveyer is thus adjustable independently of the driving of the stamper 4.

The stamper pot 2 communicates at the top by a pipe or hose 26 with the lower end of a hose filter 27. At the bottom the hose filter 27 is connected by a pipe or hose 28 with a bolting hutch, a plan sifter 30 for example, with the interposition of a revolving sluice 29, and at the top it is connected by a pipe or hose 31 with an exhauster 32.

In advance of the stamping mill described there may be arranged in case of need a coarse stamping mill with a stamper pot 2ª, a worm conveyer 9ª, together with a driving apparatus and a filling hopper 11ª. The stamper pot 2 is connected at the top by a pipe or hose 33 with the upper end of a centrifugal separator 34, which communicates at the bottom by a pipe or hose 35, with the interposition of a revolving sluice 36 and a bolting hutch 37, with the filling hopper 11 of the worm conveyer 9, and is connected at the top by a pipe or hose 38 with the lower end of the hose filter 27.

The raw material is introduced into the filling hopper 11ª of the coarse stamper and pushed by means of the worm conveyer 9ª into the lower part of the pot 2ª, underneath the powder already present in the latter. The stamp 4ᵇ disintegrates the raw material introduced, and the finished powder is drawn by suction by means of the exhauster 32 into the separator 34. The heavy bronze powder is centrifuged against the walls of the separator and drops off the latter into the bolting hutch 37. In the latter the bronze powder is divided into different degrees of fineness, one or more of which pass into filling hopper 11 of the stamper pot 2, while the remainder are further worked up otherwise. The exhaust air of the separator 34 is drawn by suction through the pipe 38, with the fine particles of bronze contained therein, into the hose filter 27.

The bronze powder received from the filling hopper 11 of the worm conveyor 9 is introduced by the latter into the stamper pot 2, the fine stamper, and is pushed underneath the material already located in the stamper pot 2. The powder produced in the fine stamper 2 is drawn by suction through the pipe 26 into the hose filter 27. The bronze powder is held back by the filter hose in the hose filter 27, while the air escapes into the atmosphere through the pipe 31 and the exhauster 32. The bronze powder drops out of the filter 27 through the pipe 28 into the bolting hutch 30, and is here subdivided into different degrees of fineness.

On the way from the filling hoppers to the stamper pot a gradual compression of the raw material is effected, because the pitch of the worm surface gradually decreases. The angular velocity of the worm conveyers is so regulated that just as much raw material is always supplied to the pots as the stamps can work up and the suction appliances can draw off, so that the stamper fittings work quite continuously.

The number and relative arrangement of stamper fittings, filters, separators, bolting hutches and the like, is of course not limited to the constructional form illustrated, but may differ therefrom. Thus it is more particularly possible to let a number of coarse stampers or a number of fine stampers work upon a single filter, separator or sifter, or to bring two or more filters, separators or sifters into connection with a single coarse stamper or fine stamper. The subject-matter of the invention is of course adapted not only for the manufacture of bronze powder and bronze colours, but also for the pulverization and sifting of other metals and of other materials.

What I claim is:—

1. A method of working for bronze stamping mills and the like with uninterrupted charging and discharging of the stamper pot, comprising pushing the raw material into the stamper pot at the bottom, underneath the material already present therein.

2. A method of working for bronze stamping mills and the like with uninterrupted charging and discharging of the stamper pot, comprising gradually compressing the raw material on its way from a filling hopper to the stamper pot, and pushing the raw material into the stamper pot at the bottom, underneath the material already present therein, in the form of compact balls, plugs and the like.

3. A bronze stamping mill comprising a stamper pot, a filling hopper, a worm conveyor adapted to push raw material from said filling hopper into the stamper pot at the bottom, underneath the material already present therein, the pitch of said worm conveyer gradually decreasing from the hopper end to the stamper pot end.

4. A bronze stamping mill comprising a stamper pot, a filling hopper, a worm conveyer adapted to push raw material from said filling hopper into the stamper pot underneath the material already present therein, the pitch of said worm conveyer decreasing from the hopper end to the stamper pot end, a ratchet wheel for driving said worm conveyer, a pawl adapted to rotate said ratchet wheel, means for oscillating said pawl, and a curved slide for regulating the engagement of said pawl with the ratchet wheel independently of the oscillation of the pawl.

5. Apparatus for the production and sifting of bronze powder, comprising a plurality of stamping mills adapted to produce material of different degrees of fineness, an exhauster, a filter, a stamper pot in each mill, a worm conveyer adapted to feed material to each stamper pot underneath the material already present therein, and a separator connected on the one hand with a stamping mill producing a coarse product and on the other hand with the worm conveyer and the filter of a stamping mill producing a finer product, the separator being connected with the exhauster at the stamper pot of the fine stamping mill.

6. Apparatus for the production and sifting of bronze powder, comprising a plurality of stamping mills adapted to produce material of different degrees of fineness, and exhauster, a filter, a stamper pot in each mill, a worm conveyer adapted to feed material to each stamper pot underneath the material already present therein, a separator connected on the one hand with a stamping mill producing a coarse product and on the other hand with the worm conveyer and the filter of a stamping mill producing a finer product, the separator being connected with the exhauster at the stamper pot of the fine stamping mill, and a bolting hutch interposed between said separator and the stamping mill producing the finer product.

In testimony whereof I have signed my name to this specification.

ALFRED LEBRECHT.